US012782634B2

(12) United States Patent
Cucci et al.

(10) Patent No.: US 12,782,634 B2
(45) Date of Patent: Nov. 3, 2026

(54) PHOTONIC INTEGRATED CIRCUIT STRUCTURE WITH AT LEAST ONE TAPERED SIDEWALL LINER ADJACENT TO A WAVEGUIDE CORE

(71) Applicant: GlobalFoundries U.S. Inc., Malta, NY (US)

(72) Inventors: Brett T. Cucci, Colchester, VT (US); Yusheng Bian, Ballston Lake, NY (US); Abdelsalam Aboketaf, Essex Junction, VT (US); Edward W. Kiewra, South Burlington, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 316 days.

(21) Appl. No.: 18/597,173

(22) Filed: Mar. 6, 2024

(65) Prior Publication Data

US 2024/0210621 A1 Jun. 27, 2024

Related U.S. Application Data

(62) Division of application No. 17/490,059, filed on Sep. 30, 2021, now Pat. No. 11,994,714.

(51) Int. Cl.
*G02B 6/122* (2006.01)
*G02B 6/12* (2006.01)
(Continued)

(52) U.S. Cl.
CPC ......... *G02B 6/1228* (2013.01); *G02B 6/1223* (2013.01); *G02B 6/125* (2013.01);
(Continued)

(58) Field of Classification Search
CPC ...... G02B 6/1228; G02B 6/125; G02B 6/136; G02B 2006/12097; G02B 6/122;
(Continued)

(56) References Cited

U.S. PATENT DOCUMENTS 6,157,765 A * 12/2000 Bruce ..................... H01S 3/063 372/6
6,690,871 B2 2/2004 Lee et al.
(Continued)

FOREIGN PATENT DOCUMENTS

CA 3119371 A1 * 5/2020 ............ G02B 6/126
EP 3745172 A1 12/2020
(Continued)

OTHER PUBLICATIONS

Deki, Machine Translation of JP 2006-208548 A, Aug. 10, 2006. (Year: 2006).*

(Continued)

*Primary Examiner* — Michelle R Connelly
(74) *Attorney, Agent, or Firm* — Francois Pagette; Hoffman Warnick LLC

(57) ABSTRACT

Disclosed are embodiments of a photonic integrated circuit (PIC) structure with a waveguide core having tapered sidewall liner(s) (e.g., symmetric tapered sidewall liners on opposing sides of a waveguide core, asymmetric tapered sidewall liners on opposing sides of a waveguide core, or a tapered sidewall liner on one side of a waveguide core). In some embodiments, the tapered sidewall liner(s) and waveguide core have different refractive indices. In an exemplary embodiment, the waveguide core is a first material (e.g., silicon) and the tapered sidewall liner(s) is/are a second material (e.g., silicon nitride) with a smaller refractive index than the first material. In another exemplary embodiment, the waveguide core is a first compound and the tapered sidewall liner(s) is/are a second compound with the same elements (e.g., silicon and nitrogen) as the first compound but with a smaller refractive index. Also disclosed are method embodiments for forming such a PIC structure.

15 Claims, 11 Drawing Sheets

(51) Int. Cl.
*G02B 6/125* (2006.01)
*G02B 6/132* (2006.01)

(52) U.S. Cl.
CPC .... *G02B 6/132* (2013.01); *G02B 2006/12061* (2013.01); *G02B 2006/12147* (2013.01); *G02B 6/1225* (2013.01)

(58) Field of Classification Search
CPC .......... G02B 6/132; G02B 2006/12061; G02B 6/1223; G02B 2006/12176; G02B 6/13; G02B 2006/121; G02B 6/126; G02B 6/305
See application file for complete search history.

(56) References Cited

U.S. PATENT DOCUMENTS

| | | | | |
|---|---|---|---|---|
| 6,790,697 | B2 | 9/2004 | Kobayashi et al. | |
| 7,272,279 | B2 * | 9/2007 | Ishikawa ................ | G02B 6/125 385/39 |
| 7,831,123 | B2 | 11/2010 | Sparacin et al. | |
| 7,834,389 | B2 | 11/2010 | Huang et al. | |
| 8,969,205 | B2 | 3/2015 | Shen et al. | |
| 10,670,804 | B1 | 6/2020 | Bian et al. | |
| 11,067,749 | B2 | 7/2021 | Bian et al. | |
| 2003/0026571 | A1 * | 2/2003 | Bazylenko ............. | G02B 6/136 385/132 |
| 2005/0008315 | A1 | 1/2005 | Yang et al. | |
| 2011/0311180 | A1 * | 12/2011 | Hu ......................... | G02B 6/132 427/163.2 |
| 2013/0243369 | A1 | 9/2013 | Park et al. | |
| 2019/0187369 | A1 | 6/2019 | Kiyota et al. | |
| 2019/0363516 | A1 * | 11/2019 | Higa ..................... | H01S 5/0612 |
| 2020/0333588 | A1 | 10/2020 | Inada et al. | |
| 2022/0107548 | A1 | 4/2022 | Yap | |

FOREIGN PATENT DOCUMENTS

| | | | | |
|---|---|---|---|---|
| GB | 2594359 | A | | 10/2021 |
| JP | 2006208548 | A | * | 8/2006 |
| KR | 101803326 | B1 | | 12/2017 |

OTHER PUBLICATIONS

Menard, Machine Translation of CA 3119371 A1, May 14, 2020. (Year: 2020).*

Bian et al., "Monolithically integrated silicon nitride platform," OSA 2021, pp. 1-3.

Bian et al., "Towards Low-Loss Monolithic Silicon and Nitride Photonic Building Blocks in State-of-the-Art 300nm CMOS Foundry," Frontiers in Optics/Laser Science, OSA 2020, pp. 1-2.

Chen et al., "Broadband Directional Couplers Fabricated in Bulk Glass with High Repetition Rate Femtosecond Laser Laser Pulses," Optics Express 11470, vol. 16, No. 15, 2008, pp. 1-12.

De Luca et al., "Tuning of the Silicon Nitride Refractive Index by RF Sputtering Power," PrePrints, 2021, pp. 1-7.

Giewont et al., "300-mm Monolithic Silicon Photonics Foundry Technology," IEEE Journal of Selected Topics in Quantum Electronics, vol. 25, No. 5, 2019, pp. 1-12.

Kaloyeros et al., "Review-Silicon Nitride and Silicon Nitride-Rich Thin Film Technologies: State-of-the-Art Processing Technologies, Properties, and Applications," ECS Journal of Solid State Science and Technology, 2020, 9, 063006, pp. 1-54.

KR10-1803326B1 Machine Translation, Dec. 2017, 9 pages.

Li et al., "Ultralow-Loss, High-Density SOI Optical Waveguide Routing for Macrochip Interconnects," Optics Express 12035, vol. 20, No. 11, 2012, pp. 1-6.

Rakowski et al., "45nm CMOS—Silicon Photonics Monolithic Technology (45CLO) for Next-Generation, Low Power and High Speed Optical Interconnects," OSA 2020, pp. 1-3.

Shi et al., "A Review: Preparation, Performance, and Applications of Silicon Oxynitride Film," Micromachines, 10, 552, 2019, pp. 1-23.

Vohanka et al., "Optical Characterization of Non-Stoichiometric Silicon Nitride Films Exhibiting Combined Defects," MDPI, Coatings, 9, 416, 2019, pp. 1-21.

Wolf et al., "Scattering-Loss Reduction of Ridge Waveguides by Sidewall Polishing," Optics Express 19815, vol. 26, No. 16, 2018, pp. 1-6.

* cited by examiner

OR

OR

PHOTONIC INTEGRATED CIRCUIT STRUCTURE WITH AT LEAST ONE TAPERED SIDEWALL LINER ADJACENT TO A WAVEGUIDE CORE

BACKGROUND

Field of the Invention

The present invention relates to photonic integrated circuit (PIC) structures.

Description of Related Art

An optical waveguide is a physical structure that guides optical signal propagation in a photonic integrated circuit (PIC) structure. Such an optical waveguide can include a waveguide core (also referred to as a transmission medium) in an elongated shape and surrounded by cladding material with a smaller refractive index than the core material. The cladding material that surrounds the waveguide core can include multiple cladding material layers of the same or different materials covering the bottom surface, the top surface, and the sidewalls of the waveguide core. The function of the cladding material is to confine the optical signals within the waveguide core by reflection at interfaces between the two materials. Confinement can be strengthened by increasing the refractive index contrast between the core and cladding materials. However, it has been noted that core material surface roughness, particularly, at the sidewalls of a ridge waveguide core causes scattering losses and a high refractive index contrast between the waveguide core and cladding materials is associated greater scattering losses.

SUMMARY

In view of the foregoing, disclosed herein are embodiments of a photonic integrated circuit (PIC) structure with a waveguide core having tapered sidewall liner(s). Also disclosed herein are method embodiments for forming such a PIC structure.

More particularly, disclosed herein are embodiments of a photonic integrated circuit (PIC) structure. In each of the embodiments, the PIC structure can a waveguide core with opposing sidewalls. The PIC structure can further include at least one tapered sidewall liners positioned laterally adjacent to at least one of the opposing sidewalls. Each tapered sidewall liner can have bottom end, a top end opposite the bottom end, a first side immediately adjacent to one of the opposing sidewalls of the waveguide core and extending between the bottom end and the top end, and a second side opposite the first side, extending between the bottom end and the top end, and having a shape that is, for example, linear, curved, or stepped such that the width of the sidewall liner decreases between the bottom end and the top end and, more particularly, such that the tapered sidewall liner has a first width at the bottom end and a second width that is less than the first width at the top end.

In some of the embodiments, multiple instances of such waveguide cores are incorporated into a multi-waveguide photonic device. For example, in some embodiments, the PIC structure can include a device, such as a directional coupler or a slot waveguide core, that includes a pair of waveguides with each waveguide having a corresponding waveguide core with opposing sidewalls. The PIC structure can further include at least one tapered sidewall liner positioned laterally adjacent to at least one of the opposing sidewalls of at least one waveguide core of the pair of waveguides. As discussed above, each tapered sidewall liner can have bottom end, a top end opposite the bottom end, a first side immediately adjacent to one of the opposing sidewalls of the waveguide core and extending between the bottom end and the top end, and a second side opposite the first side, extending between the bottom and the top, and having a shape that is, for example, linear, curved, or stepped such that the width of the sidewall liner decreases between the bottom and the top and, thus, such that the sidewall liner is considered a tapered sidewall liner.

Also disclosed herein are method embodiments for forming the above-described structure embodiments. Generally, the method embodiments can include forming a waveguide core having opposing sidewalls. The method embodiments can further include forming at least one tapered sidewall liner positioned laterally adjacent to at least one of the opposing sidewalls of the waveguide core. The sidewall liner(s) can specifically be formed such that each tapered sidewall liner has bottom end, a top end opposite the bottom end, a first side immediately adjacent to one of the opposing sidewalls of the waveguide core and extending between the bottom end and the top end, and a second side opposite the first side, extending between the bottom end and the top end, and having a shape that is, for example, linear, curved, or stepped such that the width of the sidewall liner decreases between the bottom end and the top end and, more particularly, such that the tapered sidewall liner has a first width at the bottom end and a second width that is less than the first width at the top end.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1A:
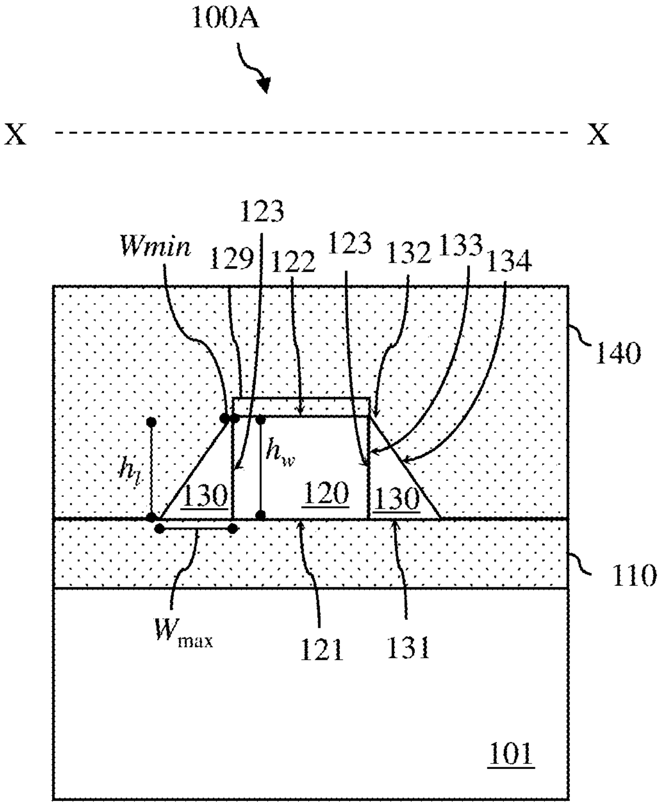
FIGS. 1A-1D are cross-section diagrams illustrating different embodiments, respectively, of a photonic integrated circuit (PIC) structure with a waveguide core and tapered sidewall liner(s)

As mentioned above, an optical waveguide is a physical structure that guides optical signal propagation in a photonic integrated circuit (PIC) structure. Such an optical waveguide can include a waveguide core (also referred to as a transmission medium) in an elongated shape and surrounded by cladding material with a smaller refractive index than the core material. The cladding material that surrounds the waveguide core can include multiple cladding material layers of the same or different materials covering the bottom surface, the top surface, and the sidewalls of the waveguide core. The function of the cladding material is to confine the optical signals within the waveguide core by reflection at interfaces between the two materials. Confinement can be strengthened by increasing the refractive index contrast between the core and cladding materials. However, it has been noted that waveguide core surface roughness, particularly, at the sidewalls of a ridge waveguide core causes scattering losses and a high refractive index contrast between the core and cladding materials is associated greater scattering losses. One technique for reducing scattering losses is to reduce the refractive index contrast between the core and cladding materials but this technique can lead to poor confinement and a large mode size. Other techniques for reducing scattering losses include polishing the waveguide core sidewalls to reduce surface roughness or forming multi-layered sidewall liners with an essentially uniform thickness covering the sidewalls of the waveguide core where the layers the liner on each sidewall have progressively decreasing refractive indices but these techniques increase processing complexity and expense and the multi-layered sidewall liners can increase the footprint of the waveguide.

In view of the foregoing, disclosed herein are embodiments of a photonic integrated circuit (PIC) structure with tapered sidewall liner(s) adjacent to a waveguide core. For example, symmetric tapered sidewall liners can be on opposing sidewalls of the waveguide core, asymmetric tapered sidewall liners can be on opposing sidewalls of the waveguide core, or a tapered sidewall liner can be on only one sidewall of the waveguide core. In some embodiments, the tapered sidewall liner(s) and waveguide core can have different refractive indices. For example, the waveguide core could be made of a first material (e.g., silicon) and the tapered sidewall liner(s) could be made of a second material (e.g., silicon nitride) with a smaller refractive index than the first material. Alternatively, the waveguide core could be made of a first compound and the tapered sidewall liner(s) could be made of second compound with identical elements (e.g., silicon and nitrogen) as the first compound but with a smaller refractive index. Generally, the shape and material (and thereby the refractive index) of tapered sidewall liner(s) as well as the symmetry or asymmetry of the configuration can be customized to steer the optical mode and, particularly, to selectively adjust the refractive index contrasts at the opposing sidewalls of the waveguide core in order to selectively adjust (i.e., shift) the position of light signals being propagated through the waveguide core. In some embodiments, the shape and material (and thereby the refractive index) of symmetric tapered sidewall liners can specifically be customized to achieve the same graded refractive index contrasts at the opposing sidewalls of the waveguide core in order to reduce scattering losses associated with surface roughness of the opposing sidewalls. Also disclosed herein are method embodiments for forming such a PIC structure.

Figure 1B:
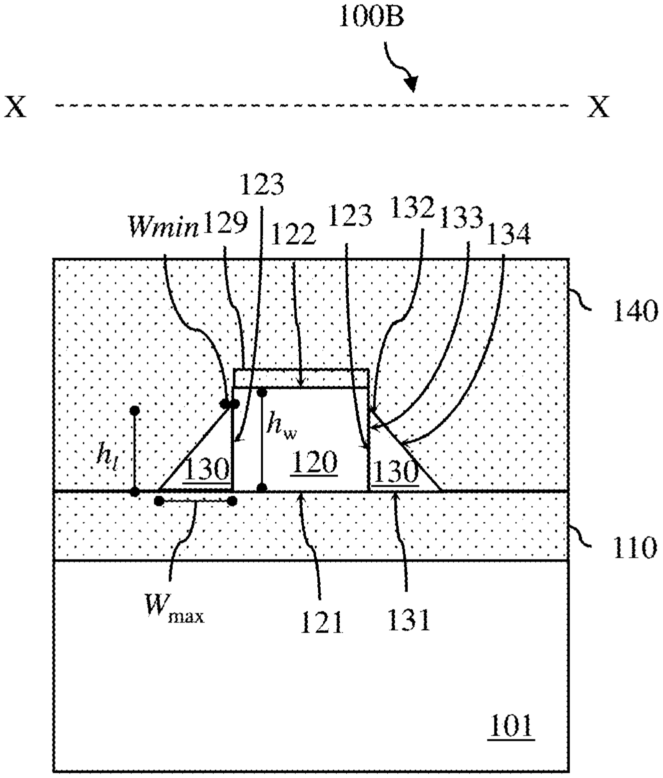
Figure 1C:
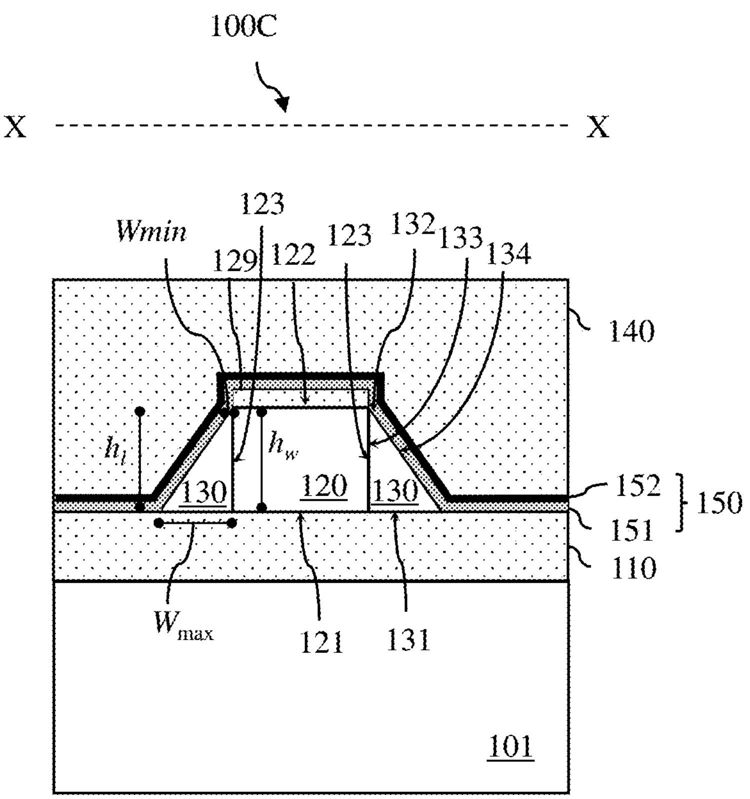
Figure 4A:
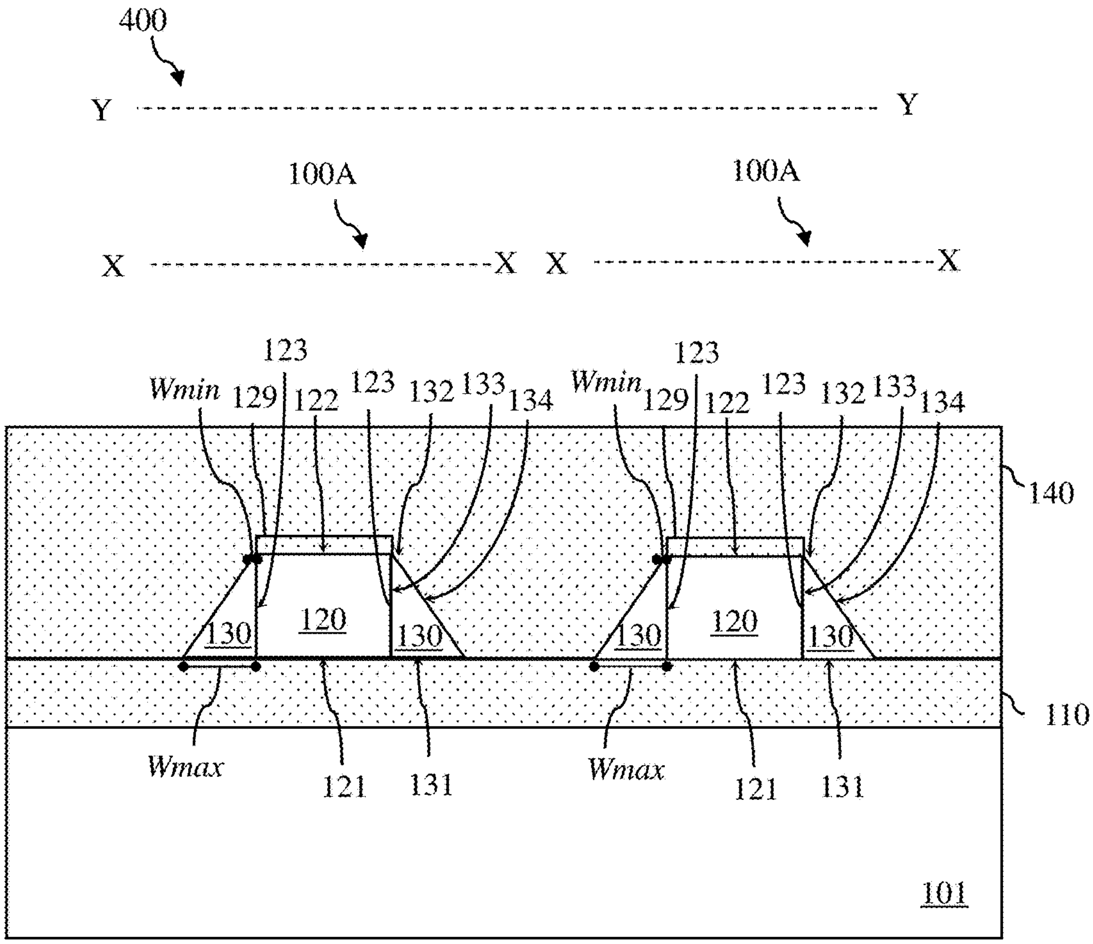
FIGS. 4A and 4B are cross-section and layout diagrams illustrating a photonic integrated circuit (PIC) structure including a directional coupler.
Figure 5A:
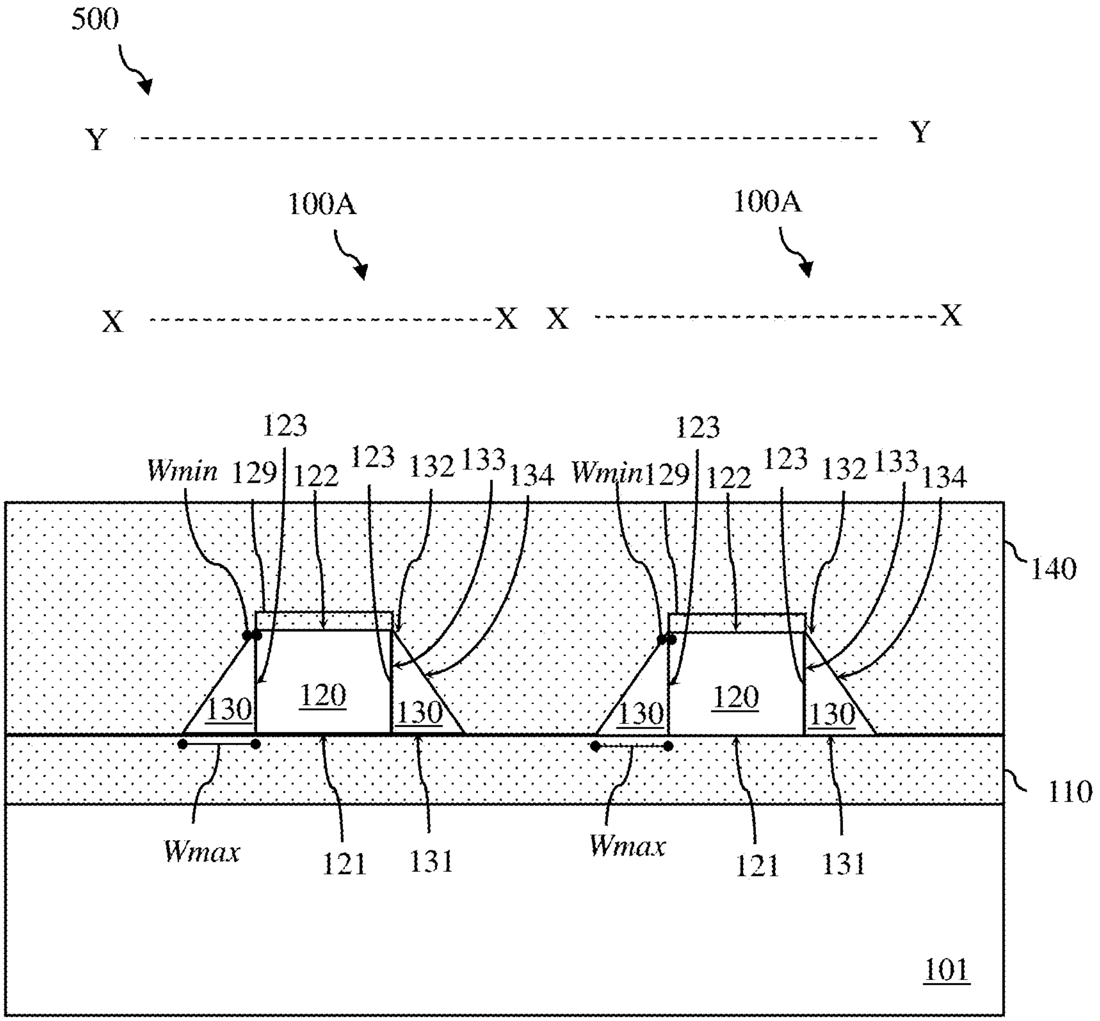
FIGS. 5A and 5B are cross-section and layout diagrams illustrating a photonic integrated circuit (PIC) structure including a slot waveguide.

More particularly, disclosed herein are various embodiments of a photonic integrated circuit (PIC) structure with at least one tapered sidewall liner 130 positioned laterally adjacent to at least one sidewall of at least one waveguide core 120 (e.g., see exemplary PIC structure embodiments 100A of FIG. 1A, 100B of FIG. 1B, 100C of FIG. 1C, 400 of FIG. 4A and 500 of FIG. 5A). Each of these exemplary PIC structure embodiments can include a substrate 101. The substrate 101 can be, for example, a semiconductor substrate, such as a silicon substrate. Optionally, each of the exemplary PIC structure embodiments can further include an insulator layer on the substrate 101. The insulator layer can be, for example, a silicon dioxide layer (also referred to herein as a buried oxide (BOX) layer).

Figure 1D:
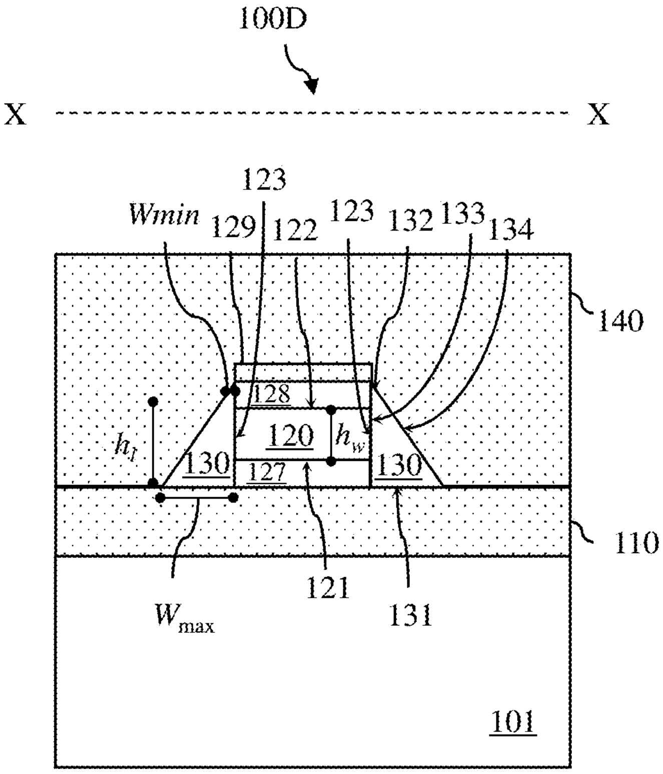

Each of the exemplary PIC structure embodiments 100A of FIG. 1A, 100B of FIG. 1B, 100C of FIG. 1C, 100D of FIG. 1D, 400 of FIG. 4A and 500 of FIG. 5A can further include at least one waveguide core 120 on a cladding material layer 110. For purposes of illustration, the waveguide core(s) 120 are shown in the figures as being on the insulator layer (e.g., the BOX layer, which has a refractive index that is, for example, smaller than 1.6) and, thus, the insulator layer is also referred to herein as the cladding material layer 110. However, it should be understood that the figures are not intended to be limiting and that, alternatively, the cladding material layer 110 could be at some other level within the PIC structure (e.g., above a silicon layer on the insulator layer).

Figure 2A:
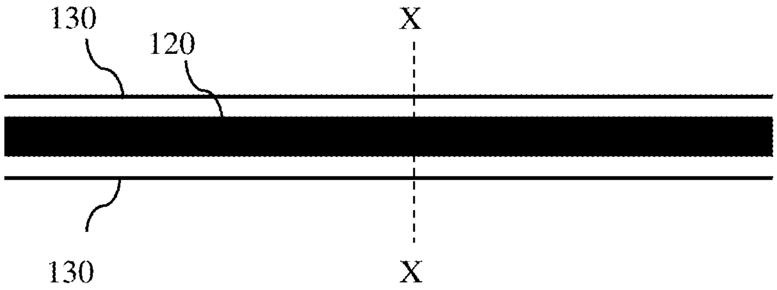
FIGS. 2A-2D are layout diagram illustrating exemplary shapes of waveguide cores that can be incorporated into any of the PIC structure embodiments disclosed herein.
Figure 2B:
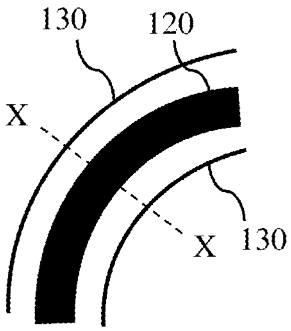
Figure 2D:
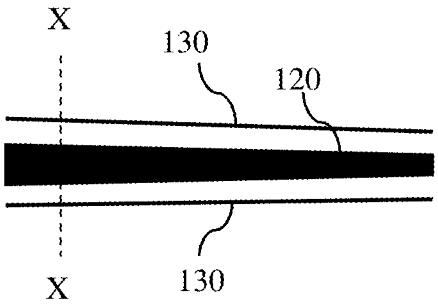
Figure 2C:
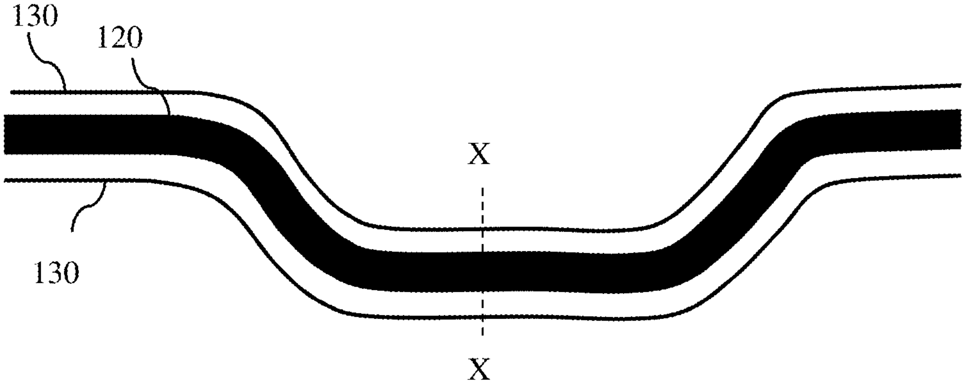
Figure 3A:
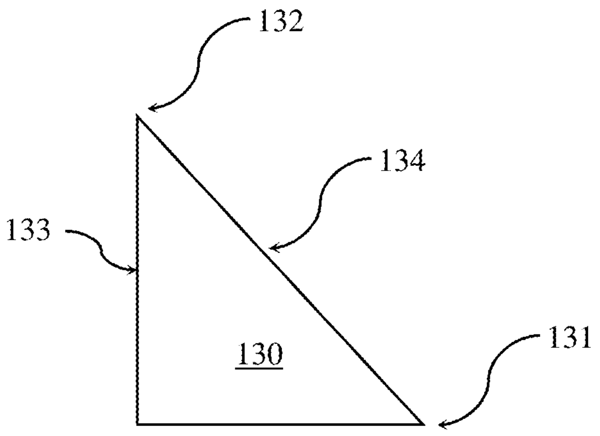
FIGS. 3A-3E illustrate different shapes, respectively, of tapered sidewall liners that can be incorporated into any of the PIC structure embodiments disclosed herein.
Figure 3B:
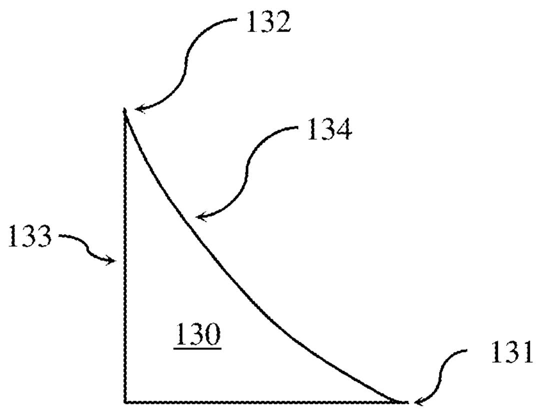
Figure 3C:
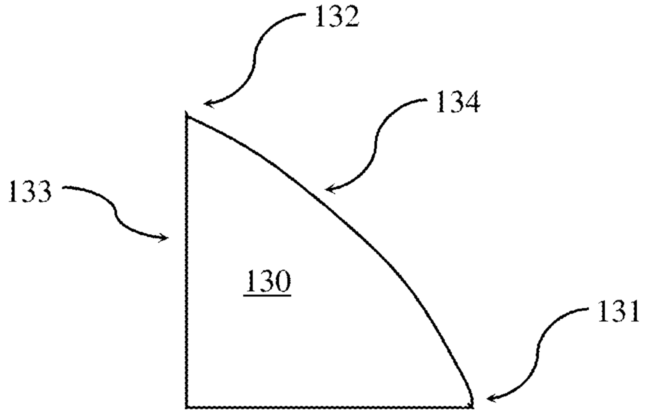
Figure 3D:
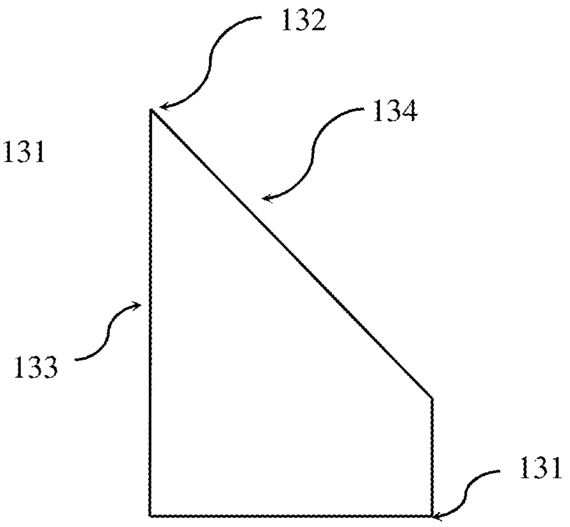
Figure 3E:
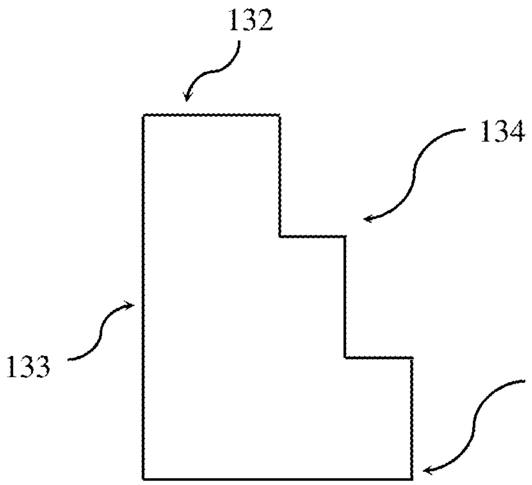

In any case, a cross-sectional shape of a waveguide core 120 along its width can be essentially rectangular with a planar bottom surface 121, a planar top surface 122 opposite the planar bottom surface 121 and opposing sidewalls 123, which are oriented essentially perpendicular to the top surface of the cladding material layer (i.e., essentially vertically oriented). The overall shape of a waveguide core 120 (e.g., in a top down view) can vary (e.g., depending upon the application). For example, a waveguide core 120 could be linear (e.g., see the linear waveguide core in the top view layout diagram of FIG. 2A), could be curved (e.g., see the curved waveguide core in the top view layout of FIG. 2B), or could have both linear and curved sections (e.g., see the waveguide core in the top view layout diagram of FIG. 2C). Furthermore, a waveguide core 120 could have an essentially uniform width (e.g., as shown in FIGS. 2A-2C) or could have varying widths (e.g., see the tapered waveguide core, which has a width that decreases from one end to the other, in the top view layout diagram of FIG. 2D), etc. It should be understood that the figures are not intended to be limiting and that waveguide core(s) 120 could have any other suitable shape with essentially vertically opposing sidewalls.

The waveguide core(s) 120 can have a height ($h_w$) as measured, for example, from the bottom surface 121 adjacent to the cladding material layer 110 to the top surface 122.

Finally, the waveguide core(s) 120 can be a made of a first material (also referred to herein as a core material or a transmission medium) with a first refractive index. The first material could, for example, be silicon. Those skill in the art will recognize that silicon can have a refractive index between, for example, approximately 3.3 to approximately 3.6. Alternatively, the first material could, for example, be a first compound, such as a silicon and nitrogen-containing compound (e.g., standard stoichiometric silicon nitride ($Si_3N_4$)). Those skilled in the art will recognize that silicon and nitrogen-containing compounds can have refractive indices that range between, for example, approximately 1.5 and approximately 2.8 or even larger (e.g., up to 3.2). Alternatively, the first material could be any other suitable waveguide core material.

Each of the exemplary PIC structure embodiments 100A of FIG. 1A, 100B of FIG. 1B, 100C of FIG. 1C, 100D of FIG. 1D, 400 of FIG. 4A and 500 of FIG. 5A can further include at least one tapered sidewall liner 130 (also referred to herein as a tapered sidewall spacer, cover or path), which is essentially vertically-oriented and positioned laterally adjacent to and at least partially covering (i.e., lining) at least one sidewall 123 of a waveguide core 120. For purposes of illustration, the exemplary PIC structure embodiments are shown in the figures as having symmetric tapered sidewall liners 130 positioned laterally adjacent to the opposing sidewalls of each waveguide core 120.

In any case, each sidewall liner 130 can have a bottom end 131 (also referred to herein as a base) adjacent to the cladding material layer 110, a top end 132 (also referred to herein as an apex) opposite the bottom end 131, a first side 133 (also referred to herein as an internal side) immediately adjacent to and at least partially covering (i.e., lining) a sidewall 123 of a waveguide core 120 so that it is essentially vertically oriented and extending from the bottom to the top, and a second side 134 (also referred to herein as an external side) opposite the first side, extending from the bottom end to the top end and having a shape that is, for example, angled and linear, curved, stepped, etc. such that the width of each sidewall liner 130, as measured from the first side 133 to the second side 134, decreases between the bottom end and the top end and, more particularly such that the sidewall liner has a first width (referred to herein as a maximum width ($W_{max}$)) at the bottom end 131 and a second width (referred to herein as a minimum width (Wmin)) that is less the first width (Wmax) or virtually no width at the top end 132 and, thus, such that the sidewall liner 130 is considered a tapered sidewall liner.

Each tapered sidewall liner 130 can have a maximum height ($h_l$) as measured, for example, from the bottom 131 adjacent to the cladding material layer 110 to the top 132. In some embodiments, the maximum sidewall liner height ($h_l$) can be essentially the same as the height ($h_w$) of the waveguide core(s) 120 (e.g., see the exemplary PIC structure embodiments 100A of FIG. 1A, 100C of FIG. 1C, 400 of FIG. 4A and 500 of FIG. 5A). In other embodiments, the maximum sidewall liner height ($h_l$) can be different from the height ($h_w$) of the waveguide core(s) 120. For example, see the exemplary PIC structure embodiment 100B of FIG. 1B where the maximum sidewall liner height (hl) as measured from the bottom 131 to the top 132 is less than the height ($h_w$) of the waveguide core 120.

FIGS. 3A-3E illustrate various alternative shapes for a tapered sidewall liner 130. In some embodiments, each tapered sidewall liner 130 can be essentially triangular in shape (e.g., see FIG. 3A and see also the exemplary PIC structure embodiments 100A of FIG. 1A, 100B of FIG. 1B, 100C of FIG. 1C, 100D of FIG. 1D, 400 of FIG. 4A and 500 of FIG. 5A). That is, the second side 134 of each sidewall liner 130 can be essentially linear and can extend, at an angle, from a point on the top surface of the cladding material layer some distance from the sidewall 123 of the waveguide core 120 to a point at height ($h_l$) on the sidewall 123 of the waveguide core 120 some distance above the top surface of the cladding material layer. In this case, the width of the sidewall liner 130 decreases essentially linearly between a first width (referred to herein as the maximum width (Wmax) at the bottom end 131 and a second width (referred to herein as the minimum width (Wmin)), which is less than the first width, at the top end 132. Alternatively, the second side 134 of each sidewall liner 130 could be curved (e.g., see the concave second side 134 in FIG. 3B; see also the convex second side 134 in FIG. 3C). Alternatively, the second side 134 could be otherwise shaped, such as stepped (e.g., see FIG. 3E), trapezoidal (e.g., see FIG. 3D), etc. so that width of the sidewall liner, as measured from the first side 133 to the second side 134, decreases between the bottom end and the top end and, more particularly, such that the bottom end 131 has a first width ($W_{max}$) and the top end 132 has a second width (Wmin) that is less than the first width or virtually no width.

Finally, each tapered sidewall liner 130 can be a made of a second material with a second refractive index. In some embodiments, the second refractive index of the second material of each tapered sidewall liner 130 can be different from the first refractive index of the first material of the waveguide(s) 120. Alternatively, the first refractive index and the second refractive index could be the same. Generally, the shape and material (and thereby the refractive index) of tapered sidewall liner(s) as well as the symmetry or asymmetry of the configuration can be customized to steer the optical mode and, particularly, to selectively adjust the refractive index contrasts at the opposing sidewalls of the waveguide core in order to selectively adjust (i.e., shift) the position of light signals being propagated through the waveguide core. In some embodiments, the shape and material (and thereby the refractive index) of symmetric tapered sidewall liners can specifically be customized to achieve the same graded refractive index contrasts at the opposing sidewalls of the waveguide core in order to reduce scattering losses associated with surface roughness of the opposing sidewalls.

More specifically, in some embodiments, the second refractive index of the second material of symmetric tapered sidewall liners 130 can be smaller than the first refractive index of the first material of the waveguide core(s) 120 so that the sidewalls liners 130 can function as cladding for the waveguide core. As mentioned above, the function of the cladding material that surrounds the outer surfaces of a waveguide core is to confine optical signals within the core material of the waveguide core by reflection at interfaces between the two materials. Confinement can be strengthened by increasing the refractive index contrast between the core and cladding materials. However, alternatively, the first and second refractive indices could be the same.

In these embodiments where symmetric tapered sidewall liner(s) function as cladding, the first material of the waveguide core(s) 120 could be silicon and the second material of each tapered sidewall liner 130 could be silicon nitride (e.g., standard stoichiometric silicon nitride ($Si_3N_4$)). As mentioned above, silicon can have a refractive index between, for example, approximately 3.3 to approximately 3.6 and silicon nitride can have a refractive index between, for example, approximately 1.5 and approximately 2.8 or so. Thus, if the first material of the waveguide core(s) 120 is silicon and the second material of the sidewall liner(s) 130 is silicon nitride with a refractive index of less than 3.3, a refractive index contrast will be achieved.

Alternatively, in these embodiments where symmetric tapered sidewall liner(s) function as cladding, the first material of the waveguide(s) 120 can be a first compound and the second material of the tapered sidewall liner(s) 130 can be a second compound with a smaller refractive index than the first compound. For example, both the first compound and the second compound can be silicon and nitrogen-containing compounds with different refractive indices. As discussed in greater detail below with regard to the method embodiments, silicon nitride tapered sidewall liners 130 could be formed on a silicon nitride waveguide in such a way as to ensure that a desired refractive index contrast will be achieved.

Alternatively, in these embodiments where the symmetric tapered sidewall liner(s) function as cladding, the second material of the tapered sidewall liner(s) 130 could be any other suitable cladding material depending upon the first material of the waveguide core(s) 120. For example, if the first material used for the waveguide core(s) 120 is silicon with a refractive index (n) of, for example, approximately 3, then any of the following materials could be used as the second material for the tapered sidewall liners 130:

(1) HfO2: n=2.0754 @1.31 um, n=2.0709 @1.55 um;
(2) ZrO2 (Zirconium dioxide, Zirconia): n=2.1155 @1.31 um, n=2.1103 @1.55 um;
(3) Si3N4: n=~2 @1.31 um, 1.55 um;
(4) SiON, AlN, etc.;
(5) TiO2 (Titanium dioxide): n=2.4622 @1.31 um, n=2.4538 @1.55 um;
(6) ZnO (Zinc monoxide): n=1.9318 @1.31 um, n=1.9267 @1.55 um;
(7) Al2O3: n=1.7503 @1.31 um, n=1.7462 @1.55 um;
(8) MgO: n=1.7178 @1.31 um, n=1.7146 @1.55 um;
(9) SiO2: n=1.45 @1.31 um, 1.55 um;
(10) CaF2: n=1.4272 @1.31 um, n=1.4260 @1.55 um;
(11) OMCTS (SiCOH): n=1.406 @1.31 um, 1.55 um; and
(12) MgF2: n=1.3718 @1.31 um, n=1.3705 @1.55 um.

However, if the first material of the waveguide core(s) 120 is, for example, silicon nitride with a refractive index of approximately 2, then only (6)-(10) could be used as the second material of the tapered sidewall liners 130.

Each of the exemplary PIC structure embodiments 100A of FIG. 1A, 100B of FIG. 1B, 100C of FIG. 1C, 100D of FIG. 1D, 400 of FIG. 4A and 500 of FIG. 5A can further include a blanket dielectric layer 140 that covers the waveguide core(s) 120 and tapered sidewall liner(s) 130 thereon. This dielectric layer 140 can comprise a dielectric material, such silicon dioxide, that is different from the second material of the tapered sidewall liner(s) and that has a relatively small refractive index (e.g., smaller than 1.6) and, particularly, that has a refractive index that is smaller than the refractive index of the second material of the tapered sidewall liner(s) 130. Thus, due to the tapered (e.g., triangular, etc.) shape of each tapered sidewall liner 130, in each of the exemplary PIC structure embodiments 100A of FIG. 1A, 100B of FIG. 1B, 100C of FIG. 1C, 100D of FIG. 1D, 400 of FIG. 4A and 500 of FIG. 5A, a graded refractive index contrast is achieved with signal confinement being stronger near the bottom 121 of the waveguide core(s) 120 and gradually decreasing to its weakest point near the top 122 of the waveguide cores. This graded refractive index contrast can minimize scattering losses due to surface roughness. Additionally, as mentioned above, tapered sidewall liner(s) can be customed to steer the optical mode (e.g., shift it up or down, etc.).

Optionally, one or more cladding material layers can cover the tapered sidewall liner(s)130 and each waveguide core 120 (e.g., see the exemplary PIC structure embodiment 100C of FIG. 1C) and the blanket dielectric layer 140 can be above these layer(s). Each cladding material layer can have a refractive index that falls between the refractive index of the second material of the tapered sidewall liner(s) 130 and the refractive index of the dielectric layer 140. Furthermore, if there is a stack 150 of multiple cladding material layers covering the tapered sidewall liner(s) 130 and waveguide(s) 120, then the layers can have progressively decreasing refractive indices between a first cladding material layer 151 in the stack 150 proximal to the waveguide core(s) 120 and a last cladding material layer 152 in the stack 150 distal to the waveguide core. Exemplary cladding material layers (e.g., 151-152) can include any combination of materials (1)-(12) listed above as long as the refractive indices of these materials decrease progressively.

For purposes of illustration, the stack 150 is shown in FIG. 1C as being incorporated into a PIC structure, such as the PIC structure 100A of FIG. 1A where the height (hl) of the tapered sidewall liner(s) 130 is essentially the same as the height ($h_w$) of the waveguide core 120. However, it should be understood that the figures are not intended to be limiting. Alternatively, the stack 150 could be incorporated into a PIC structure, such as the PIC structure 100B of FIG. 1B where the height ($h_l$) of the tapered sidewall liner(s) 130 is lower than the height ($h_w$) of the waveguide core 120 and, thus, so that the lowermost conformal cladding material layer 151 would be immediately adjacent to the upper portion of the sidewalls 123 of the waveguide core.

Optionally, each waveguide core 120 can be stacked between two thin dielectric layers 127 and 128 (e.g., see the exemplary PIC structure embodiment 100D of FIG. 1D). These two dielectric layers can have the same refractive index as the sidewall liners 130 or can have a different refractive index than the sidewall liners 130. In any case, these two dielectric layers 127-128 can have a smaller refractive index than the waveguide core 120 such that they function as cladding for the waveguide core 120 for stronger bottom and top surface signal confinement. They can also have a larger refractive index than the blanket dielectric layer 140 covering the structure. These thin dielectric layers 127-128 can be the same or different materials. In some embodiments, these thin dielectric layers 127-128 can be silicon and nitrogen-containing compounds. In any case, side surfaces of these two dielectric layers 127-128 can be essentially vertically aligned with the opposing sidewalls of the waveguide core 120 and each sidewall liner 130 will be positioned laterally adjacent to a side surface of at least the lower dielectric layer 127 below the waveguide core 120. For purposes of illustration, the PIC structure embodiment 100D of FIG. 1D is shown with the height (hl) of the tapered sidewall liner(s) 130 being essentially the same as the height ($h_w$) of the waveguide core 120 and further shown without the stack 150 of one or more cladding material layers 151-152 covering the waveguide core and tapered sidewall liner(s). However, it should be understood that the figures are not intended to be limiting. Alternatively, the PIC structure 100D of FIG. 1D could include a stack 150 of cladding material layer(s) 151-152 covering the waveguide core and tapered sidewall liner(s) and/or could be configured such that the height ($h_l$) of the tapered sidewall liner(s) 130 is lower than the height ($h_w$) of the waveguide core 120.

In some embodiments, multiple instances of any of the waveguide cores with tapered sidewalls liner(s) described above and illustrated in FIGS. 1A-1D could be used to form a multi-waveguide photonic device.

Figure 4B:
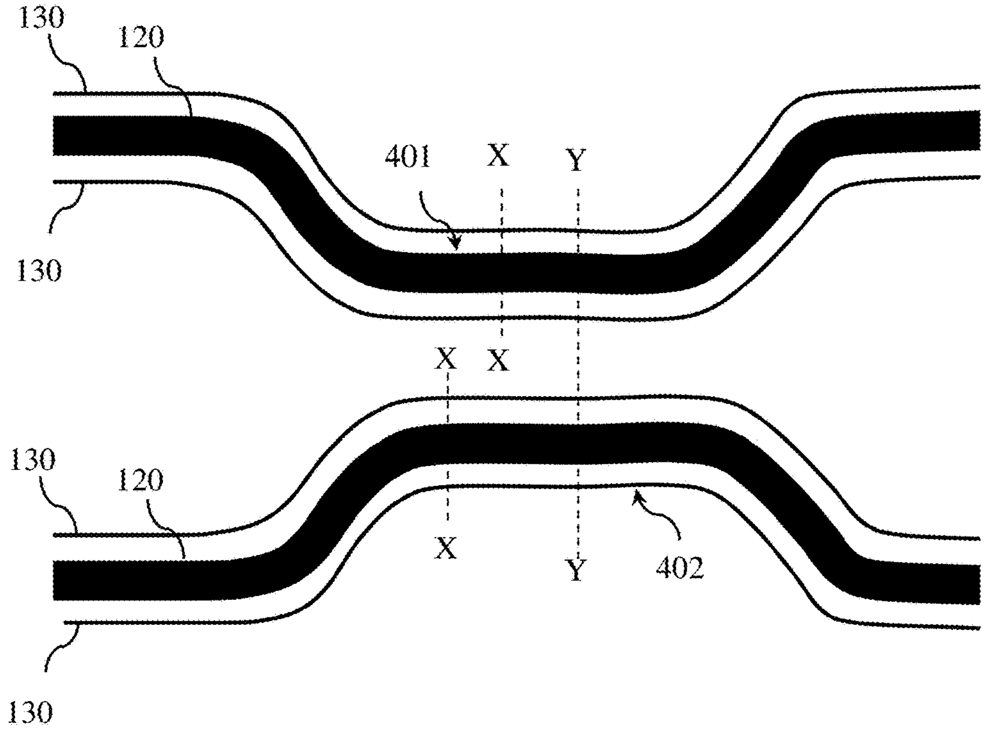

For example, referring to FIGS. 4A-4B, the exemplary PIC structure embodiment 400 can include a cladding material layer 110 and, on the cladding material layer 110, a pair of waveguide cores 120 for a pair of waveguides of a directional coupler. The pair of waveguide cores 120 can include, for example, a primary waveguide core for a primary waveguide of the directional coupler and a secondary waveguide core for a secondary waveguide of the directional coupler. As shown in FIG. 4B, a linear section 401 of one of the waveguide cores 120 can be positioned laterally adjacent and essentially parallel to a linear section 402 of the other one of the waveguide cores 120. The adjacent linear sections 401-402 of the two waveguide cores can be sufficiently close to enable optical coupling. The exemplary PIC structure embodiment 400 can further include, as discussed above: at least one tapered sidewall liner 130 (e.g., triangular-shaped sidewall liner(s) or other tapered sidewall liner(s), as discussed above and illustrated in FIGS. 3A-3E) positioned laterally adjacent to at least one of the opposing sidewall 123 of at least one of the waveguide cores 120; and a blanket dielectric layer 140 covering the tapered sidewall liner(s) 130 and the waveguide cores 120 and filling any spaces therebetween.

Figure 5B:
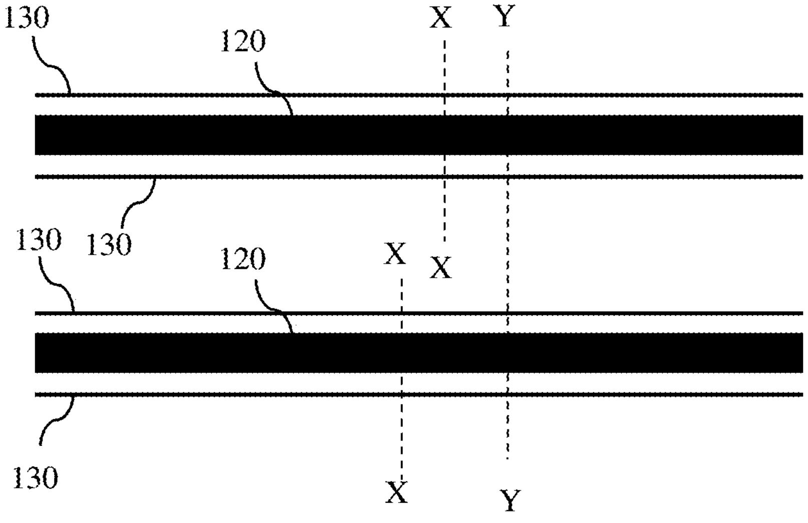

Also, for example, referring to FIGS. 5A-5B, the exemplary PIC structure embodiment 500 can include a cladding material layer 110 and, on the cladding material layer 110, a pair of waveguide cores 120 for a pair of waveguides of a slot waveguide. The pair of waveguide cores 120 can be parallel and configured to form the slot waveguide. Specifically, the pair of waveguide cores 120 can be separated by a subwavelength-scale low refractive index region through which strongly confined light is guided. The exemplary PIC structure embodiment 500 can further include, as discussed above: at least one tapered sidewall liner 130 (e.g., triangular-shaped sidewall liner(s) or other tapered sidewall liner (s), as discussed above and illustrated in FIGS. 3A-3E) positioned laterally adjacent to at least one of the opposing sidewalls 123 of at least one of the waveguide cores 120; and a blanket dielectric layer 140 covering the sidewall liners 130 and waveguide cores 120 and filling any spaces therebetween.

For purposes of illustration, the exemplary PIC structure embodiments 400 and 500 are shown in the figures as having symmetric tapered sidewall liners 130 on opposing sides of each of the waveguide cores 120. Additionally, for purposes of illustration, the exemplary PIC structure embodiments 400 and 500 are illustrated in the drawings as including multiple-instances of the structure 100A of FIG. 1A incorporated into a directional coupler and a slot waveguide, respectively. However, it should be understood that directional couplers, slot waveguide cores and the like could be formed from multiple instances of any of the structures 100A-100D or combinations thereof. Benefits associated with the tapered shape of sidewall liner(s) 130 and a resulting graded refractive index in a multi-waveguide photonic device, not only include reduced scattering losses associated with waveguide core material surface roughness, but also enhanced interactions between the waveguide cores.

Figure 6:
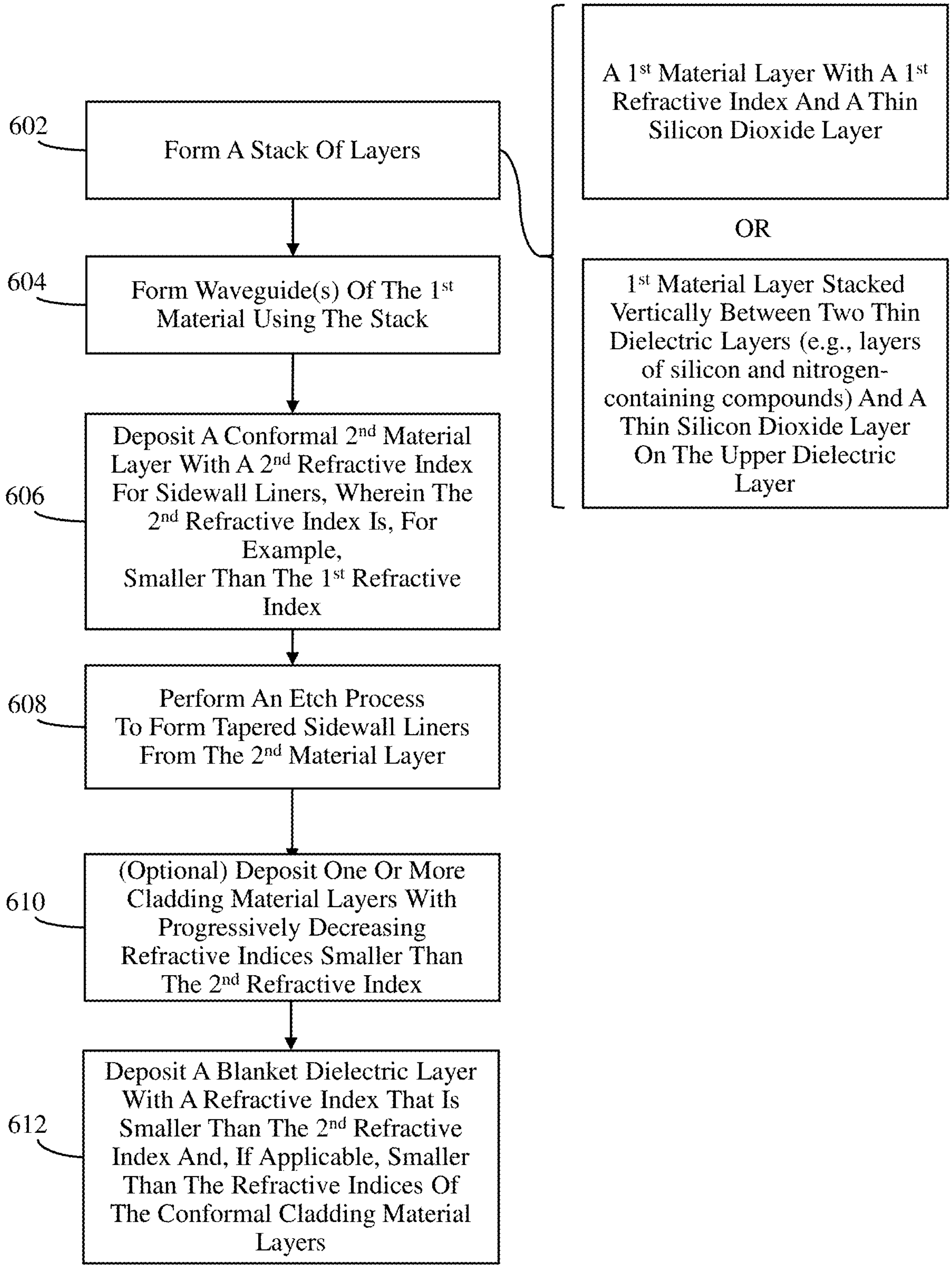
FIG. 6 is a flow diagram illustrating embodiments of a method of forming a PIC structure with a waveguide core and tapered sidewall liner(s)

Also disclosed herein are method embodiments for forming the above-described structure embodiments. Referring to the flow diagram of FIG. 6, the method embodiments can include forming one or more waveguide cores 120. To form the waveguide core(s) 120, a stack of layers can be formed on a cladding material layer 110 (see process step 602 and FIG. 7A or 7B).

For purposes of illustration, the cladding material layer 110 is shown as being an insulator layer (e.g., a buried oxide (BOX) layer on a semiconductor substrate 101, such as a silicon substrate. Optionally, each of the exemplary PIC structure embodiments can further include an insulator layer on the substrate 101. The insulator layer can be, for example, a silicon dioxide layer (also referred to herein as a buried oxide (BOX) layer, which has a refractive index smaller than 1.6). However, it should be understood that the figures are not intended to be limiting and that, alternatively, the cladding material layer 110 could be at some other level (e.g., above a silicon layer on the insulator layer).

Figure 7A:
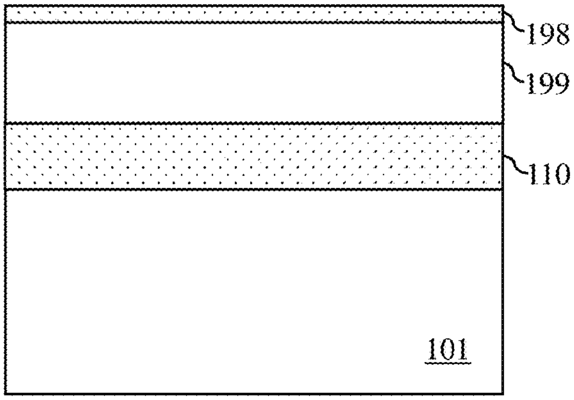
FIGS. 7A and 7B are cross-section diagram illustrating alternative partially completed PIC structures formed at process step 602 of the flow diagram of FIG. 6.
Figure 7B:
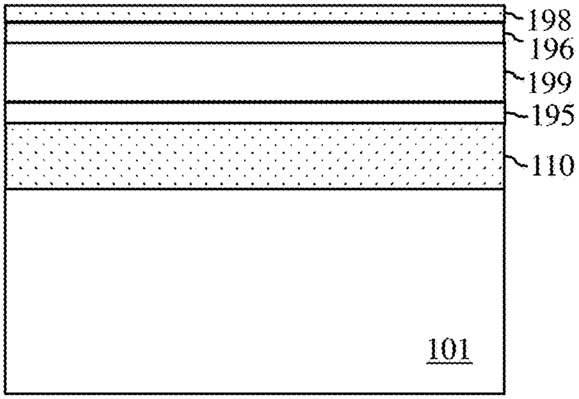

In some embodiments, as shown in FIG. 7A, the stack of layers formed at process step 602 can include a first material layer 199. The first material layer can be a core material layer for the waveguide core and can have a first refractive index. The first material layer could be, for example, a silicon layer, a silicon nitride layer, or some other suitable waveguide core material layer. The stack of layers can further include a thin mask layer 198 (e.g., a silicon dioxide layer with a refractive index smaller than 1.6) on the first material layer 199.

In other embodiments, as shown in FIG. 7B, the stack of layers formed at process step 602 can include the first material layer 199, as described above with respect to FIG. 7B, stacked two dielectric layers 195 and 196. The two dielectric layers can be relatively thin and can have refractive indices that are smaller than the refractive index of the first material layer 199. The two dielectric layers 195-196 can be, for example, layers of silicon and nitrogen-containing compounds with the same or different refractive indices. It should be noted that if the first material layer 199 is also a silicon and nitrogen-containing compound, then the deposition techniques used to form the layers 195, 196 and 199 should be selected so as to achieve a refractive index contrast between the layer 199 and the layers 195-196.

Those skilled in the art will recognize that different deposition parameters can be employed to vary the optical properties of deposited thin films, such as silicon nitride. For example, sputtering depositions can be employed to obtain films with customizable optical properties. During sputtering deposition of silicon nitride, increasing nitrogen flux can result in a larger refractive index and vice versa. Alternatively, during sputtering deposition of silicon nitride, the sputtering power can be selectively varied to vary the refractive index. Those skilled in the art will recognize that specifications for sputter deposition of silicon nitride can be varied to achieve refractive indices ranging from 1.6-3.2. In any case, the stack of layers can also include a thin mask layer 198 (e.g., a silicon dioxide layer) on the upper dielectric layer 196.

Figure 8A:
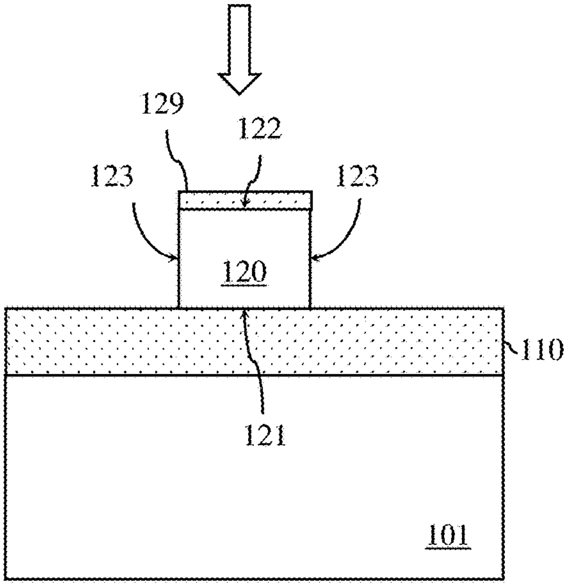
FIGS. 8A and 8B are cross-section diagrams illustrating partially completed PIC structures formed at process step 604 with respect to the structures of FIGS. 7A and 7B, respectively.
Figure 8B:
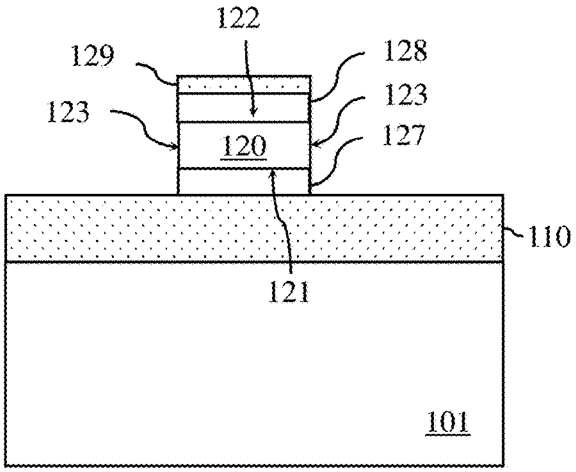

The waveguide core(s) 120 can subsequently be formed from the stack of layers (see process step 604 and FIG. 8A or 8B). For example, the stack of layers can be lithographically patterned and etched using conventional techniques so that waveguide core(s) 120 with the desired shape are formed on the cladding material layer 110. Depending on the stack of layers formed at process step 602, each waveguide core 120 will be capped with a protective layer and, particularly, an oxide cap 129 (see FIG. 8A) or each waveguide core 120 will be between two thin dielectric layers 127 and 128 with a smaller refractive index than the waveguide core so that they function as cladding (e.g., silicon and nitrogen-containing compound layers) and capped with a protective layer 129 (e.g., an oxide cap) (see FIG. 8B). As illustrated, all layers in each patterned stack will have essentially vertically aligned sidewalls.

Figure 9A:
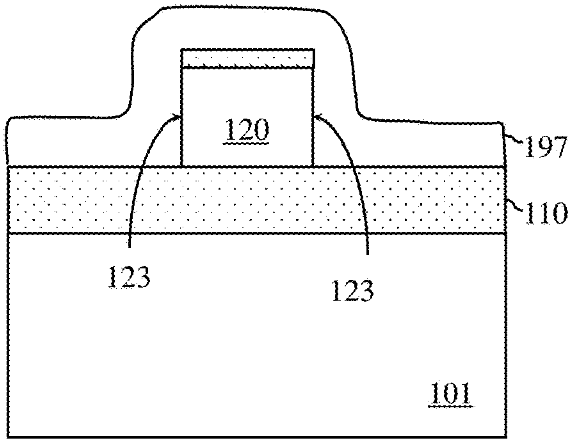
FIGS. 9A and 9B are cross-section diagrams illustrating partially completed PIC structures formed at process step 606 with respect to the structures of FIGS. 8A and 8B, respectively.
Figure 9B:
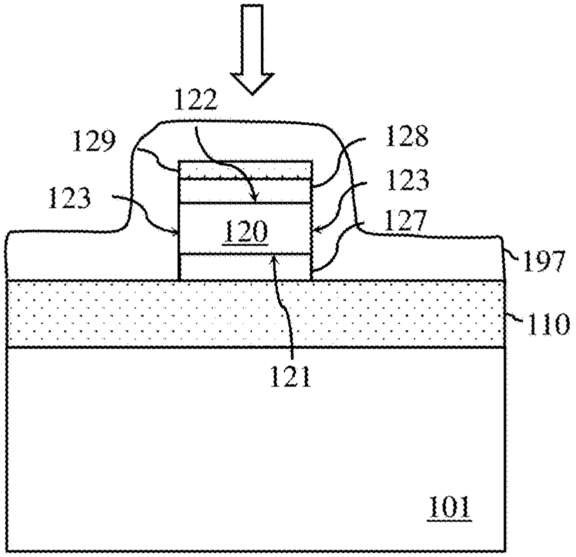

The method embodiments can further include forming at least one tapered sidewall liner 130 positioned laterally adjacent to at least one of the opposing sidewalls of the at least one waveguide core 120. For example, a conformal second material layer 197 (also referred to herein as a sidewall liner material layer) can be formed over the partially completed structure (e.g., on the cladding material layer 110 and each patterned stack including a waveguide core 120) (see process step 606 and FIG. 9A or FIG. 9B). The second material layer 197 can have a second refractive index. The second material layer 197 can be different from the first material layer 199 used to form the waveguide core(s) 120.

For example, in some embodiments, the first material layer can be silicon and the second material layer can be silicon nitride. As mentioned above, silicon can have a refractive index between, for example, approximately 3.3 to approximately 3.6 and silicon nitride can have a refractive index between, for example, approximately 1.5 and approximately 2.8 or larger (e.g., up to 3.2). Thus, in this case, the second refractive index of the second material layer 197 would be smaller than the first refractive index of the first material layer 199 used to form the waveguide core(s) 120.

In some embodiments, the first and second material layers can be first and second compounds, respectively, that include identical elements but that have different refractive indices. For example, the first compound could be a first silicon and nitrogen-containing compound with a first refractive index and the second compound could be a second silicon and nitrogen-containing compound with a second refractive index that is less than the first refractive index. As mentioned above, deposition techniques used to form silicon and nitrogen-containing compounds (i.e., silicon nitrides) can be selected so as to achieve a refractive index contrast between the first material layer 199 and the second material layer 197 (e.g., see the discussed above at process step 602 related to the selection of different deposition parameters to vary the optical properties of deposited thin films, such as silicon nitride).

Next, the tapered sidewall liners 130 can be formed from the second material layer 197 on the opposing sidewalls 123 of the waveguide core(s) 120 (see process step 608 and FIGS. 10A1-2 or FIGS. 10B1-2). Specifically, an etch process can be performed to etch away horizontal portions of the second material layer, leaving vertical portions at least partially covering (i.e., lining) the sidewalls of waveguide core(s). This etch process can specifically be performed so that each sidewall liner 130 is tapered in some fashion. Specifically, the etch process can be performed so that each sidewall liner 130 has a bottom end 131 (also referred to herein as a base) adjacent to the cladding material layer 110, a top end 132 (also referred to herein as an apex) opposite the bottom end 131, a first side 133 (also referred to herein as an internal side) immediately adjacent to a sidewall 123 of the waveguide core 120 so as to be essentially vertically oriented and extending from the bottom end to the top end, and a second side 134 (also referred to herein as an external side) opposite the first side, extending between the bottom end and the top end, and having a shape that is, for example, linear, curved, or stepped such that the width of the sidewall liner decreases, as measured from the first side 133 to the second side 134, decreases from one width (referred to herein as a maximum width ($W_{max}$)) at the bottom end 131 to a lesser width or, as illustrated, to virtually no width at the top end 132 such that the sidewall liner 130 is considered a tapered sidewall liner.

In some embodiments, the etch process can specifically be performed so that each sidewall liner 130 is essentially triangular in shape. That is, the etch process can be performed so that the second side 134 of each sidewall liner 130 is essentially linear and extends, at an angle, from a point on the top surface of the cladding material layer 110 some distance (equal to $W_{max}$) from the sidewall 123 of the waveguide core 120 to a point at height ($h_l$) on the sidewall 123 of the waveguide core 120 some distance above the top surface of the cladding material layer. In this case, the width of the sidewall liner 130 decreases essentially linearly between the bottom 131 and the top 132. An exemplary RIE etch technique for forming such triangular shaped sidewall liner includes modulation of factors such as ion energy, pressure, residence time, and gas flow ratios to achieve the desired profile for a given thickness and film.

In some embodiments, the etch process can be performed so that the resulting tapered sidewall liners 130 have some other suitable tapered shape (e.g., as illustrated in FIGS. 3B-3E).

Figures 1, 10A:
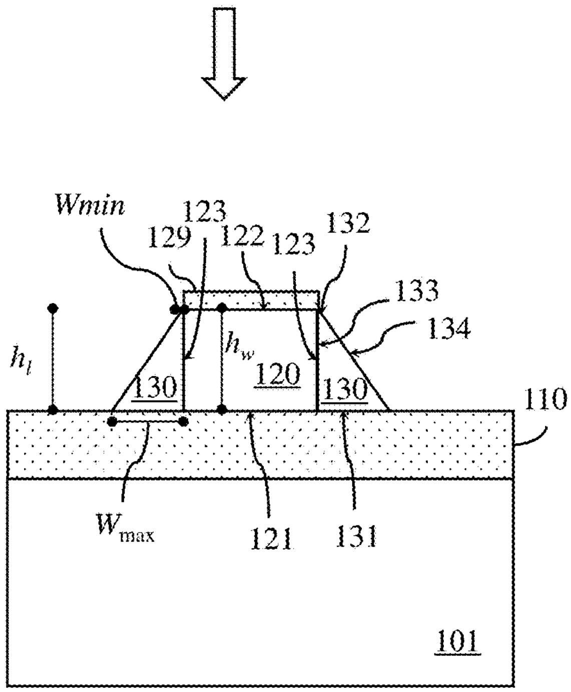
FIG. 10A-1 or 10A-2 and 10B-1 or 10B-2 are cross-section diagrams illustrating alternative partially completed PIC structures formed at process step 608 with respect to the structures of FIGS. 9A and 9B, respectively.
Figures 1, 10B:
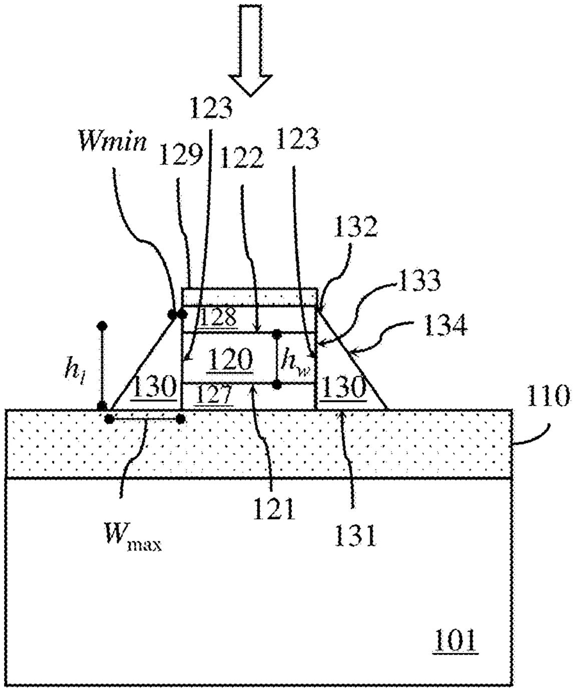
Figures 2, 10A:
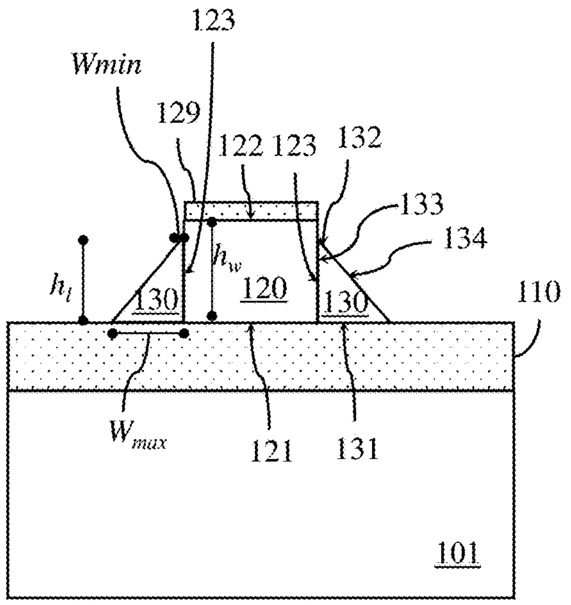
Figures 2, 10B:
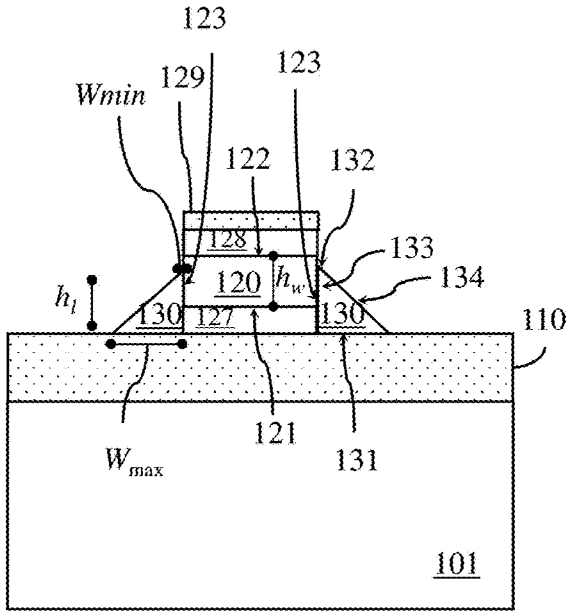

In any case, the etch process at process step 608 can further be performed so that the sidewall liners 130 have a maximum height ($h_l$) as measured, for example, from the bottom end 131 adjacent to the cladding material layer 110 to the top end 132. In some embodiments, the etch process can be performed so that the maximum sidewall liner height ($h_l$) is at least as high as the oxide cap 129. For example, etching can be performed so that the maximum sidewall liner height ($h_l$) is essentially the same as the height of the ($h_w$) of the adjacent waveguide core 120, as shown in FIG. 10A-1, or above the height of the ($h_w$) of the adjacent waveguide core 120, as shown in FIG. 10B-1. In other embodiments, the etch process can be performed so that the maximum sidewall liner height ($h_l$) is some distance below the oxide cap 129, as shown in FIG. 10A-2 and FIG. 10B-2.

Figure 11A:
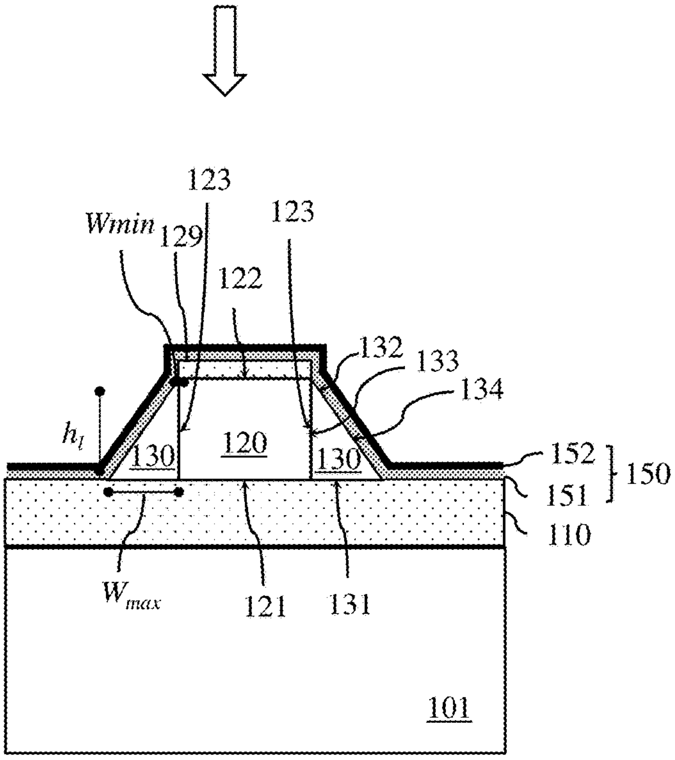
FIGS. 11A and 11B are cross-section diagrams illustrating partially completed PIC structures optionally formed at process step 608 with respect to the structures of FIGS. 10A-1 and 10B-1, respectively.
Figure 11B:
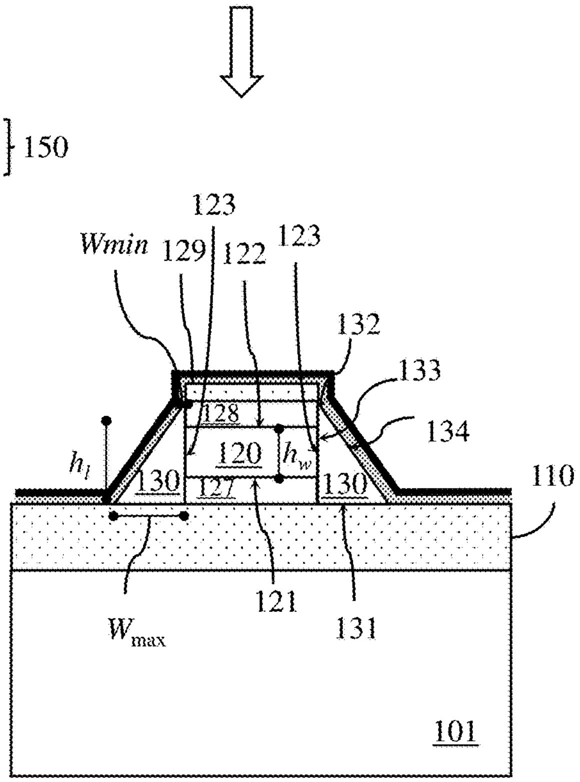

Optionally, one or more cladding material layers can be deposited (e.g., conformally) over the partially completed structure (see process step 610 and FIG. 11A or 11B). Each of these cladding material layer(s) can have a refractive index that is less than the refractive index of the second material of the tapered sidewall liners 130. Furthermore, if there is a stack 150 of multiple cladding material layers, then the layers can have progressively decreasing refractive indices between a first cladding material layer 151 in the stack 150 proximal to the waveguide core(s) 120 and a last cladding material layer 152 in the stack 150 distal to the waveguide core. See the detailed discussion above regarding the structure embodiments and the exemplary materials that could be used for layers 151 and 152.

Finally, a blanket dielectric layer 140 can be deposited over the partially completed structure and polished (e.g., using a conventional chemical mechanical polishing (CMP) process) (see process step 612 and, for example, FIGS. 1A-1D). The dielectric layer 140 can comprise a dielectric material, such a silicon dioxide, that is different from the second material of the tapered sidewall liner(s) and that has a relatively low refractive index (e.g., smaller than 1.6) and, particularly, that has a refractive index that is smaller than the refractive index of the second material of the tapered sidewall liner(s) 130 and, if applicable, smaller than any cladding material layers 151-152.

Given the method embodiments described above, which result in tapered sidewall liners 130 adjacent to the opposing sidewalls of each waveguide core 120, a graded refractive index contrast can be achieved with signal confinement being stronger near the bottom 121 of the waveguide core(s) 120 and gradually decreasing to its weakest point near the top 122 of the waveguide cores. This graded refractive index contrast minimizes scattering losses due to surface roughness and can also improve interactions between adjacent waveguide cores (e.g., if/when multi-waveguide photonic devices, as shown in FIGS. 4 and 5, are formed according to the method embodiments).

Figure 12:
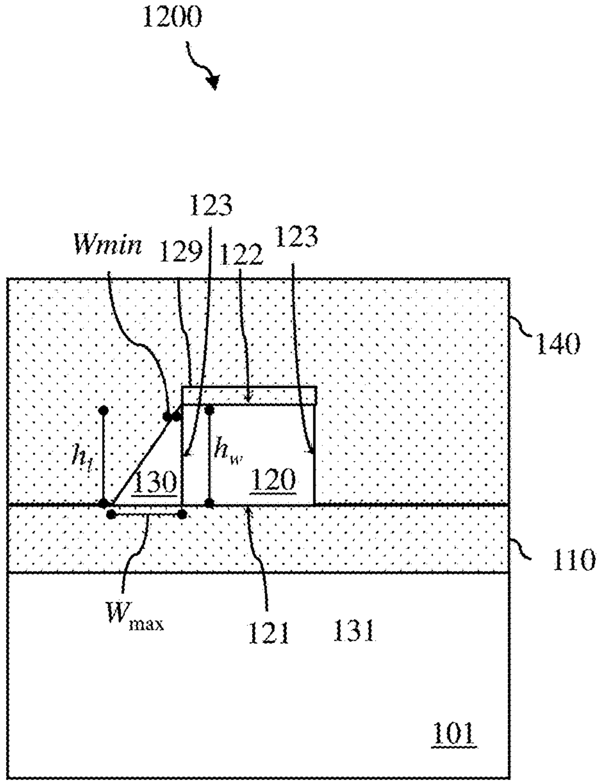
FIG. 12 is a cross-section diagram of an alternative embodiment of a PIC structure having a tapered sidewall liner adjacent to only one side of a waveguide core.
Figure 13:
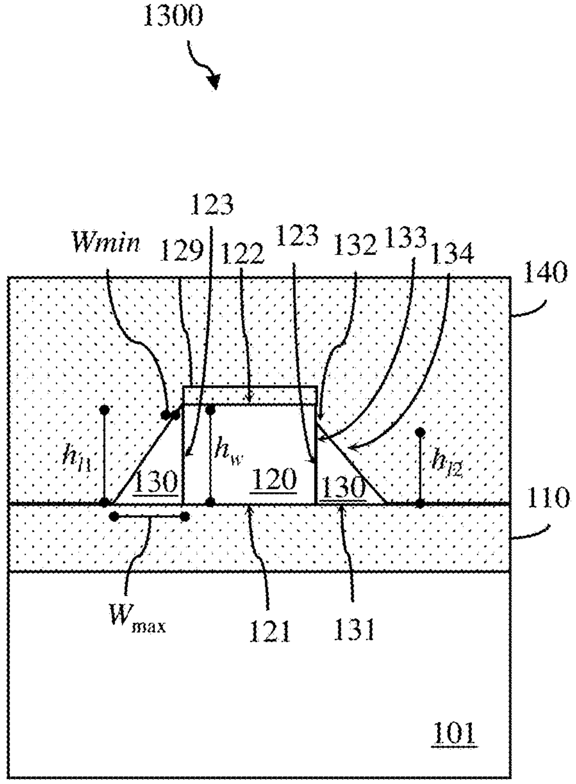
FIG. 13 is a cross-section diagram of another alternative embodiment of a PIC structure with asymmetric tapered sidewall liners on opposing sides of a waveguide core.

It should be noted that in the structure and method embodiments described above, symmetric tapered sidewall liners 130 are shown on the opposing sidewalls 123 of each waveguide core 120. However, as mentioned above, the figures are not intended to be limiting. Alternatively, some embodiments of the disclosed PIC structure can have an asymmetric configuration. For example, see the exemplary PIC structure embodiment 1200 of FIG. 12 which includes only one tapered sidewall liner 130 on one sidewall 123 of a waveguide core 120 or the exemplary PIC structure embodiment 1300 of FIG. 12 which includes tapered sidewall liners 130 with different heights ($h_{l1}$ and $h_{l2}$) on opposing sidewalls 123 of the waveguide core 120. Optionally, either of these PIC structure embodiments could include the one or more additional cladding material layers 151-152 shown in the PIC structure embodiment 100C and/or the dielectric layers 127-128 below and above the waveguide core 120 shown in the PIC structure embodiment 100D. Those skilled in the art will recognize that additional masking and/or etch processes would be incorporated into the process flow to achieve such structures. For example, after symmetric first and second tapered sidewall liners are formed on opposing sides of a waveguide core 120, a mask layer (e.g., a nitride mask layer) could be formed (e.g., deposited and patterned) over the first tapered sidewall liner, leaving the second tapered sidewall liner exposed. The second tapered sidewall liner could then be etched away completely as shown in FIG. 12 or partially etched so that the first and second tapered sidewall liners have different heights as shown in FIG. 13. The mask layer could subsequently be selectively removed and processing could continue with process steps 610-612 as described above and illustrated in the flow diagram of FIG. 6. In any case, the asymmetric tapered sidewall liner configuration (e.g., only one tapered sidewall liner or liners with different heights) could be used to steer light and, particularly, to cause light to turn in one direction or the other.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed structures and methods and is not intended to be limiting. For example, as used herein, the singular forms “a”, “an” and “the” are intended to include the plural forms as well, unless the context clearly indicates otherwise. Additionally, as used herein, the terms “comprises”, “comprising”, “includes” and/or “including” specify the presence of stated features, integers, steps, operations, elements, and/or components, but do not preclude the presence or addition of one or more other features, integers, steps, operations, elements, components, and/or groups thereof. Furthermore, as used herein, terms such as “right”, “left”, “vertical”, “overlying”, “parallel”, “perpendicular”, etc., are intended to describe relative locations as they are oriented and illustrated in the drawings (unless otherwise indicated) and terms such as “touching”, “in direct contact”, “abutting”, “directly adjacent to”, “immediately adjacent to”, etc., are intended to indicate that at least one element physically contacts another element (without other elements separating the described elements). The term “laterally” is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:

a waveguide core having opposing sidewalls; and tapered sidewall liners positioned laterally adjacent to the opposing sidewalls of the waveguide core, wherein the tapered sidewall liners have different heights than the waveguide core, an insulator layer;

a lower dielectric layer on the insulator layer, wherein the waveguide core is above and immediately adjacent to the lower dielectric layer; and an upper dielectric layer on the waveguide core, wherein the tapered sidewall liners are above and immediately adjacent to the insulator layer and further positioned laterally immediately adjacent to the lower dielectric layer and the waveguide core and the upper dielectric layer, and wherein top ends of the tapered sidewall liners are at a same level as a top surface of the upper dielectric layer.

2. The structure of claim 1, further comprising:

a protective layer immediately adjacent to a top surface of the waveguide core; and a dielectric layer on the tapered sidewall liners and the protective layer.

3. The structure of claim 1, wherein the tapered sidewall liners are greater in height than the waveguide core.

4. The structure of claim 1, wherein the lower dielectric layer and the upper dielectric layer include silicon and nitrogen-containing compounds with smaller refractive indices than the waveguide core.

5. The structure of claim 1, wherein the tapered sidewall liners each have a first side adjacent to the waveguide core and a second side opposite the first side and having a linear shape.

6. The structure of claim 1, further comprising:

a stack of cladding material layers over the tapered sidewall liners and the waveguide core, wherein the cladding material layers in the stack have progressively decreasing refractive indices between a first cladding material layer in the stack proximal to the waveguide core and a last cladding material layer in the stack distal to the waveguide core; and a dielectric layer on the stack, wherein a refractive index of the dielectric layer is smaller than the refractive indices of all the cladding material layers in the stack.

7. A structure comprising:

an insulator layer;

a waveguide core on the insulator layer and having opposing sidewalls; and tapered sidewall liners on the insulator layer and adjacent the opposing sidewalls, wherein the tapered sidewall liners are asymmetric and wherein each tapered sidewall liner has a bottom end adjacent the insulator layer, a top end opposite the bottom end, a first side adjacent a sidewall of the waveguide core, and a second side opposite the first side, and wherein a width of the tapered sidewall liner decreases between the bottom end and the top end.

8. The structure of claim 7, wherein the tapered sidewall liners have different heights.

9. The structure of claim 7, wherein a top surface of the waveguide core is at a same level as a top end of only one of the tapered sidewall liners.

10. The structure of claim 7, wherein the first side adjacent to the waveguide core and the second side opposite the first side each have a linear shape.

11. The structure of claim 7, further comprising:

a protective layer on the waveguide core; and a dielectric layer on the tapered sidewall liners and the protective layer.

12. A structure comprising:

a waveguide core having opposing sidewalls; and a tapered sidewall liner and a dielectric layer positioned laterally immediately adjacent to the opposing sidewalls, respectively, wherein the dielectric layer further extends over the tapered sidewall liner.

13. The structure of claim 12, wherein the tapered sidewall liner and the waveguide core have equal heights.

14. The structure of claim 12, wherein the tapered sidewall liner has a first side adjacent to the waveguide core and a second side opposite the first side and having a linear shape.

15. The structure of claim 12, further comprising a protective layer on a top surface of the waveguide core, wherein the dielectric layer is above and immediately adjacent to the protective layer.

* * * * *